June 3, 1969 J. A. MADRE 3,447,200
FISH HOLDER
Filed Jan. 3, 1967

INVENTOR
JAMES A. MADRE

BY
ATTORNEYS

United States Patent Office 3,447,200
Patented June 3, 1969

3,447,200
FISH HOLDER
James A. Madre, Rte. 4, Box 452,
Elizabeth City, N.C. 27909
Filed Jan. 3, 1967, Ser. No. 606,881
Int. Cl. A22c 25/08, 25/06; A47j 43/18
U.S. Cl. 17—70                                   4 Claims

ABSTRACT OF THE DISCLOSURE

A holding device for fish and the like having a handle connected to a bar with plural pick elements, and a spring member connecting the outermost pick elements for selective engagement of the fish in different positions for cleaning or handling.

BACKGROUND OF THE INVENTION

*Field of the invention*

This invention relates to devices used in holding fish and the like during handling and cleaning operations.

*Description of the prior art*

Previous proposals for fish holders include boards with attached spike elements as shown in United States Patent Nos. 1,132,417; 2,523,736; and 2,932,849, and separate spike elements as shown in United States Patent No. 3,015,180. These previous devices depend solely on a clamping action combined with body piercing members, and are subject to objection as being unduly cumbersome and bulky, and as failing to provide needed holding engagement of the fish during both transport and cleaning operations.

SUMMARY OF THE INVENTION

It is a basic objective of the present invention to provide a fish holder or like device wherein a plurality of pick elements or tines are provided, some of which are employed to pierce and hold the fish body and others being employed to clamp the body in place. In such arrangement, the device functions to hold the body securely without the necessity for employment of additional holding means or boards.

Another objective of the invention resides in the provision of a holder of the class described above having an extensible holding means adapting it to use with fish of variant sizes.

A further objective concerns the provision of a holder of non-complex construction and assembly, and one which is simple to use.

Other and further objects and advantages of the invention will become apparent to those skilled in the art from a consideration of the following specification and drawings:

DESCRIPTION OF THE PREFERRED EMBODIMENT

Figure 1:
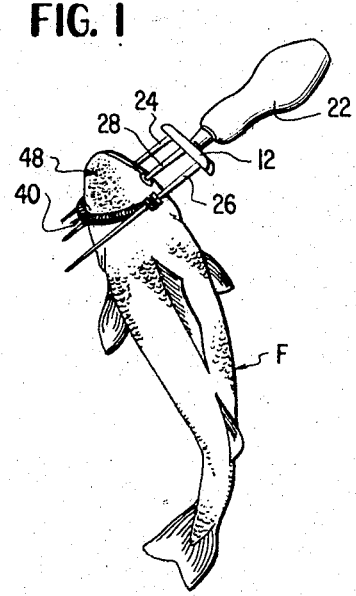
FIGURE 1 is a perspective view of the holder constructed and assembled in accordance with the teachings of this invention, showing a first position of use.

In the drawings, the holder hereof is generally identified by reference numeral 10 and comprises an elongated bar formed of metal or similar rigid material. For purposes of reference, the bar has an outer side 14, an inner side 16, and opposite end portions 18 and 20. A handle element 22 of any convenient design is fixedly secured to the bar 12 centrally on its outer side 14.

The holding means hereof comprises a plurality of pick elements or tines, includinng outer pick elements 24 and 26 secured on the outer side 16 of the bar 12 at the end portions 18 and 20, respectively, thereof. Further included is an intermediate pick element 28 secured to the side 16 of the bar 12 in axial alignment with the handle 22. Each of the pick elements is of inverted conical configuration, and includes an enlarged base 30 fixedly secured to the bar and a sharply pointed distal tip 32.

The outer pick elements 24 and 26 each have a pair of upper and lower stop elements 34, 36 fixed thereon in spaced relation to define an annular slot 38 intermediate the ends of the said elements. An extensible holding member, such as a coil spring 40 is provided. The spring 40 has a main coil portion 42 and opposite looped ends 44 and 46. The looped ends are engaged about the pick elements 24 and 26 in the slots 38 defined by the stop members, and the coil section 44 passes the intermediate pick 28 on one side thereof.

Figure 2:
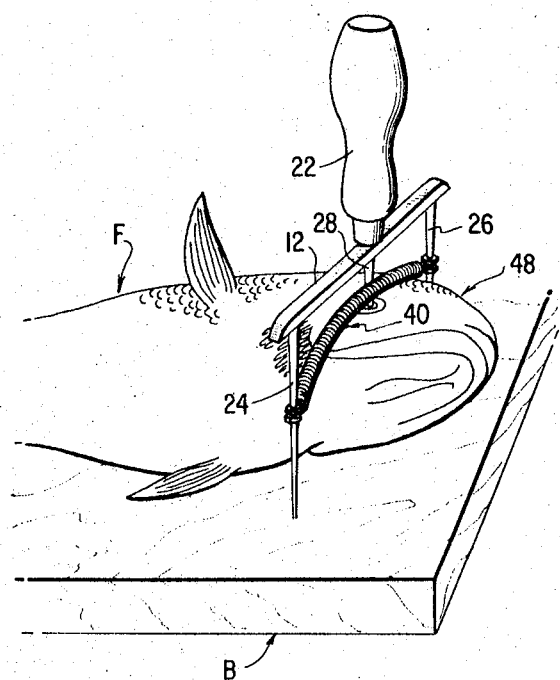
FIGURE 2 is an enlarged perspective view showing a second manner of use.
Figure 3:
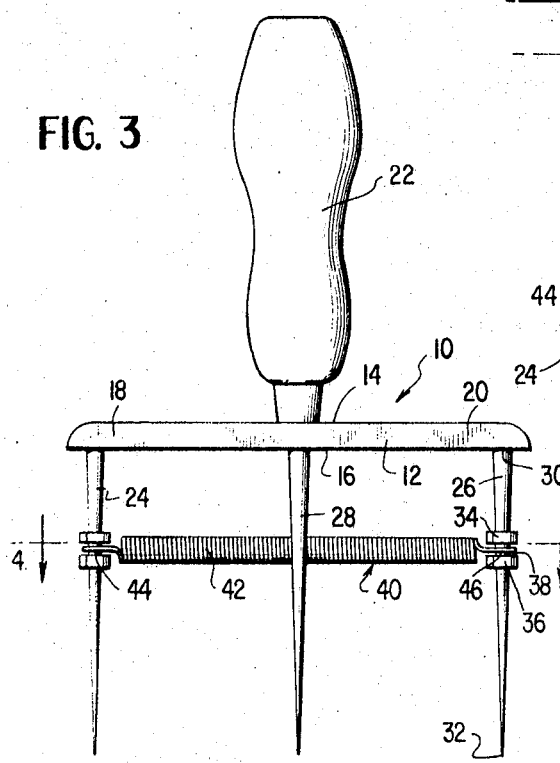
FIGURE 3 is a further enlarged, side elevational view.
Figure 4:
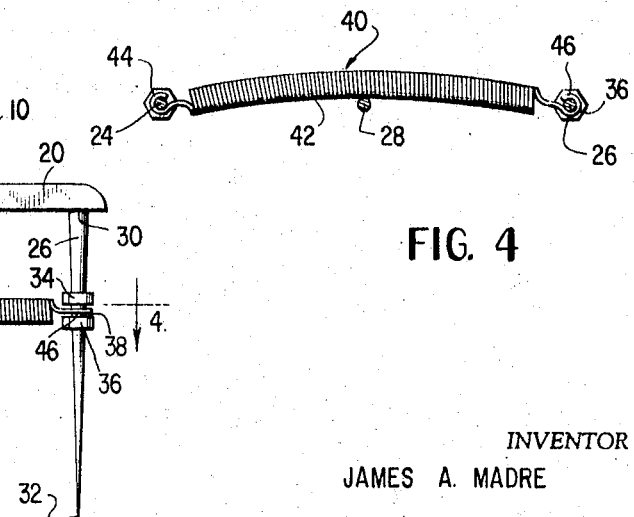
FIGURE 4 is a transverse sectional view, taken substantially on the line 4—4 of FIGURE 3, looking in the direction of the arrows.

Two alternative, non-limiting manners of use of this appliance are shown in FIGURES 1 and 2. In the former, a fish F has been impaled through its head 48 by the intermediate pick 28 and the spring 40 has been stretched and encircled about the head, thus to permit handling or conveying of the fish without danger of disengagement and without the necessity for direct handling as in removal of a hook from the fish's mouth. FIGURE 2 shows the device as employed for scaling or other cleaning operations of the fish. Here again, the pick 28 extends through the head 48, but the spring 40 is engaged to press against the head forcing it against a cleaning board B or the like. The pick elements each are pressed into the board to further prevent slippage of the fish during this operation.

Having described and illustrated an embodiment of the invention in some detail, it will be understood that this description and illustration have been offered only by way of example. The invention is to be limited in scope only by the appended claims.

I claim:
1. A fish holder comprising:
    an elongated bar having an outer side and an opposite inner side and having end portions;
    a handle projecting from the bar outer side intermediate the end portions;
    outer pick elements secured to the bar end portions and extending from the inner side of the bar;
    an intermediate pick element extending from the bar inner side opposite the handle and in axial alignment therewith;
    each of the pick elements being of substantially conical configuration and including an enlarged base fixedly secured to the bar and a sharp distal tip, the distal tip of the respective pick elements being laterally co-aligned;
    the outer pick elements each having a pair of spaced apart, enlarged stop elements fixed thereto intermediate the base and the distal tip thereof; and
    an extensible coil spring, having a main coil portion and looped ends, the looped ends being engaged about the outer pick elements between the stop elements of the respective pairs thereof and thereby retained in place.
2. A fish holder comprising, in combination:
    an elongate bar constituting a frame member,
    a handle secured to one side of said bar,
    a plurality of pick elements secured to the other side of said bar including a pair of outer pick elements adjacent opposite ends of said bar disposed in spaced re- lation to straddle a fish and an intermediate pick element,
and a freely stretchable resilient retainer having opposite end portions anchored to said outer pick elements at intermediate portions thereof, whereby said retainer may be deflected over or under a fish impaled upon said intermediate pick element while straddled by said outer pick elements to retain the fish in such impaled condition.

3. The fish holder according to claim 2 wherein said retainer is a coil spring.

4. The fish holder according to claim 3 wherein said pick elements present free end portions disposed in coplanar relation.

References Cited

UNITED STATES PATENTS

| 1,132,417 | 3/1915 | Alexander | 17—8 |
| 2,442,557 | 6/1948 | Cox | 146—218 |
| 2,813,297 | 11/1957 | Dahlin | 17—8 |

FOREIGN PATENTS

| 5,073 | 1894 | Great Britain. |
| 8,344 | 1904 | Great Britain. |

LUCIE H. LAUDENSLAGER, *Primary Examiner.*

U.S. Cl. X.R.

146—216, 218